Oct. 17, 1967  S. S. BARBERA, SR  3,347,220
PORTABLE AIR BLOWER FOR BARBECUE

Filed Jan. 13, 1966  2 Sheets-Sheet 1

INVENTOR.
SALVATORE S. BARBERA SR.
BY William R. Piper
ATTORNEY

Oct. 17, 1967   S. S. BARBERA, SR   3,347,220
PORTABLE AIR BLOWER FOR BARBECUE
Filed Jan. 13, 1966                               2 Sheets-Sheet 2
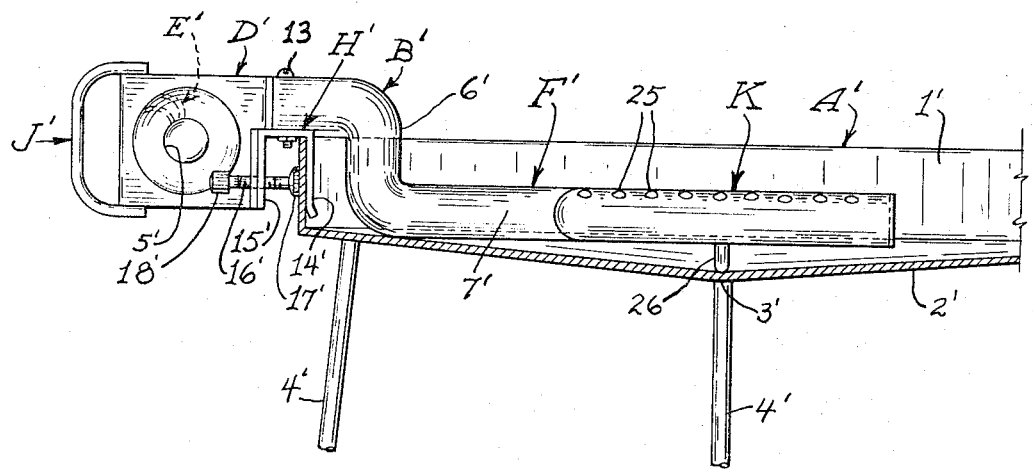
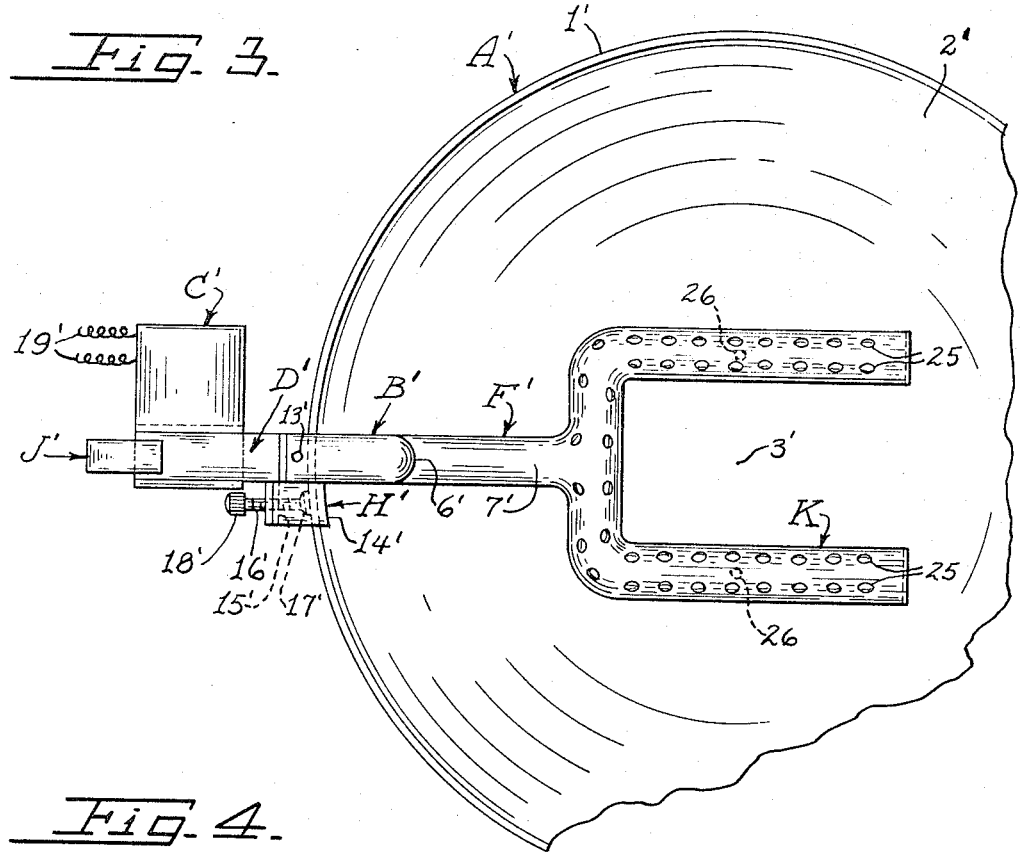
INVENTOR
SALVATORE S. BARBERA SR.
BY
William R. Piper
ATTORNEY

United States Patent Office 3,347,220
Patented Oct. 17, 1967

3,347,220
PORTABLE AIR BLOWER FOR BARBECUE
Salvatore S. Barbera, Sr., 28611 Venus St.,
Hayward, Calif. 94544
Filed Jan. 13, 1966, Ser. No. 520,410
3 Claims. (Cl. 126—25)

The present invention relates to improvements in a portable air blower for barbecue, and it consists in the combination, construction and arrangement of parts as hereinafter described and claimed.

An object of my invention is to provide a portable air blower for barbecue that can be removably attached to a barbecue and used for forcing air up through the material to be burned in the barbecue so as to aid in starting the burning process. It is well known that it is difficult to start a barbecue fire. Usually charcoal briquettes or other material is used for the barbecue fire. Whether an electrode connected to a source of electric current is used for starting the charcoal briquettes to burning or an inflammable material is poured onto the briquettes before setting fire to them, it is difficult to get the briquettes to burning to a point where the barbecue fire will keep on burning by itself.

I have invented a portable air blower for barbecue that can be removably secured to the circular flange of the barbecue and the device will direct a flow of air upwardly through the charcoal briquettes or other material to be burned that is placed on top of the central portion of the device from which the air is forced. The material to be burned can be ignited by an electrode connected to a source of electric current or an inflammable liquid may be poured over the material and then ignited by a match or the like. My device includes an electric motor that is connected to a centrifugal blower which in turn directs air through a pipe to a perforated outlet that is positioned near the center of the barbecue when my device is attached thereto. The material to be burned is placed over the perforated outlet. If an electrode is used for igniting the material, it is placed over the perforated outlet of my device and then the material to be burned is added.

My device will create a forced draft of air up through the burnable material and the operator keeps the motor operating until he is sure that the material will continue to burn without further aid. He can then open the electric circuit to the motor and remove the device from the barbecue.

The device is simple in construction and is inexpensive to manufacture. I illustrate two forms of my invention in the drawings.

Other objects and advantages will appear as the specification continues. The novel features of the invention will be set forth in the appended claims.

Drawings

For a better understanding of my invention, reference should be made to the accompanying drawings, forming part of this specification, in which:

FIGURE 3 is a side elevation of a modified form of my invention and it is shown clamped to a standard barbecue of the type shown in FIGURE 1.

FIGURE 4 is a top plan view of the modified form of the invention and it is clamped to the barbecue.

While I have shown only the preferred forms of my invention, it should be understood that various changes, or modifications, may be made within the scope of the annexed claims without departing from the spirit thereof.

Detailed description

In carrying out my invention, I make use of a barbecue indicated generally at A. This barbecue has a bowl with a cylindrical wall 1 and a bottom 2. The bottom is in the shape of a shallow cone with the deepest part of the cone being at the center 3 of the bottom. Legs 4 support the barbecue. I do not wish to be confined to any particular type of barbecue and merely show one form in all four figures.

My invention comprises a portable air blower for the barbecue and this is indicated generally at B. The air blower comprises an electric motor C, see FIGURE 2, and the motor is in turn connected to a centrifugal blower D. The centrifugal blower has an impeller shown by dotted lines at E in FIGURE 1. The casing for the centrifugal blower has a central air inlet opening 5 and the impeller draws air into the opening and forces it out through an outlet tube F.

Figure 1:
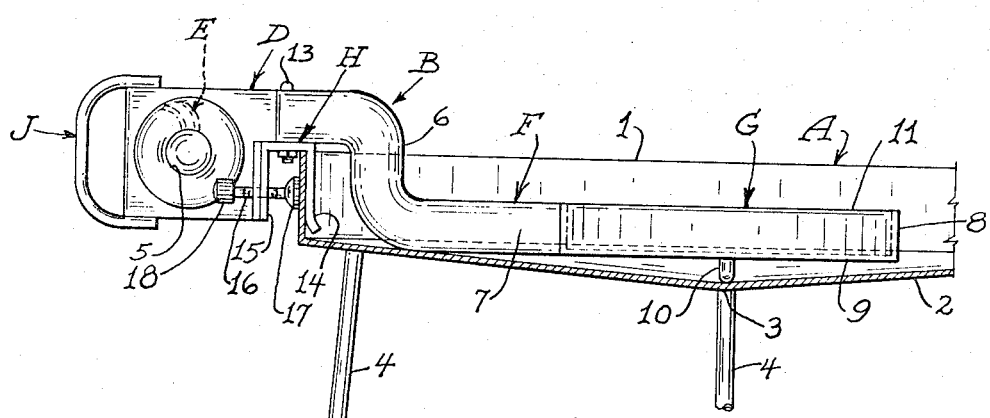
FIGURE 1 is a side elevation of a preferred form of my device and is shown removably secured to a standard barbecue, the latter being shown in section.
Figure 2:
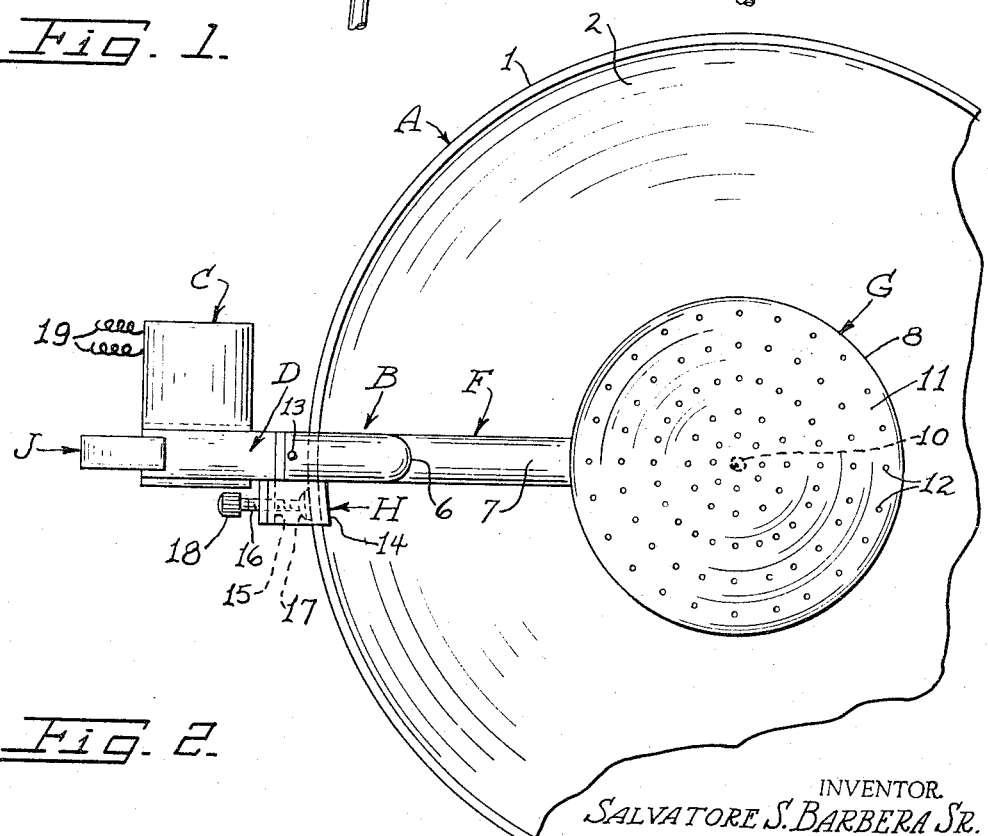
FIGURE 2 is a top plan view of the device shown in FIGURE 1, and illustrates how the perforated air outlet is placed at the center of the barbecue.

FIGURE 1 shows the air tube F provided with a downwardly extending portion 6 and a horizontal portion 7. FIGURE 2 illustrates the horizontal portion 7 communicating with a hollow disc-shaped header G. This header has a cylindrical wall 8 and a bottom wall 9, see FIGURE 1. A center pin 10 or other type of support extends downwardly from the center of the bottom wall 9 and is supported by the conical bottom 2 of the barbecue A. The pin or foot 10 supports the air outlet header G at the proper place with relation to the barbecue A. The top wall 11 for the header G is shown in FIGURE 2 and this wall has perforations 12 for the escape of air from the header. This forced air will flow through the charcoal briquettes or other burnable material that is used in the barbecue. The air is continually forced through the outlet openings 12 and flows through the burning material so long as it is necessary. As soon as combustion has reached a point of being self-sustained, the portable air blower may be removed from the barbecue and will leave the burning material in the barbecue for the purposes of frying steaks and the like.

The air blower B is removably secured to the barbecue by means of a clamping device shown in FIGURES 1 and 2. An inverted U-shaped bracket H is secured to the air outlet tube F by means of a bolt 13 or other suitable fastening means. The bracket has a downwardly extending leg 14 that is adapted to contact with the inner surface of the cylindrical wall 1 of the barbecue. The outer leg 15 of the bracket carries a threaded shaft 16 that is received in a threaded bore provided in the leg 15. The shaft 16 has a head 17 that presses against the outer surface of the cylindrical wall 1 and clamps the bracket H to the wall. A knurled knob 18 is mounted on the other end of the shaft 16 and may be rotated for moving the head 17 into clamping position on the cylindrical wall or for freeing it. The fan casing D is provided with a handle J by means of which the operator may lift the air blower from the barbecue when it is no longer needed.

Operation

The operator first secures the clamp H to the cylindrical wall 1 of the barbecue A in the manner already indicated. This will position the air outlet header G at the center of the barbecue and the foot or pin 10 will support the header a slight distance above the bottom. Charcoal briquettes or other burnable material is now placed over the header G and is ignited. The electric motor C is connected to a source of current, not shown, and will actuate the impeller E of the centrifugal blower D for drawing air through the central opening 5 and forcing it out through the perforations 12 at the top 11 of the header G.

The top 11 could be a screen through which the air flows. This forced draft of air will keep the ignited burnable material still burning until it is thoroughly set on fire and will sustain itself.

When this condition is reached, the operator may remove the portable air blower and then the burning material may be used for frying steaks, etc. The device will have a long life if it is left in the barbecue only until the barbecue fire is self-sustained and then the device is removed. An electric ON-OFF switch, not shown, may be on the electric motor casing C or in the electric wires 19 that connect the motor to an electric outlet.

In FIGURES 3 and 4, I show a slightly different form of my invention. This form is like the preferred form except that the air outlet K is in the form of a U-shaped header that communicates at its center with the horizontal portion 7' of the air outlet tube F'. All other parts of the modified form are identical to the preferred form except two depending pins 26, space the header above the bowl bottom. Similar parts in the two forms will be given the same letters and numbers except that those in the modified form will be primed.

The air outlet K is hollow and it has perforations 25 in its upper portion through which air is forced. Each leg of the header has a depending pin. The modified form operates in exactly the same manner as the preferred form.

The air outlet header K will be centered in the barbecue bowl when the device is clamped in place. No further description of the modified form need be given.

I claim:

1. In combination with a barbecue bowl having a rim, and comprising a portable air blower:
    (a) an air-conveying tube adapted to lie in a radial position in said barbecue bowl;
    (b) a clamp carried by said tube for removably securing it to a rim of the bowl in a position where the tube has an outer end extending beyond the rim; said tube having a downwardly extending portion disposed near the inner surface of the bowl rim when said clamp is secured to said rim so that the inner portion of the tube that projects from the downwardly extending portion will lie adjacent to the bottom of the bowl;
    (c) an electric motor driven centrifugal blower connected to the outer end of said tube so as to dispose the motor and blower exterior of the barbecue rim; and
    (d) a perforated air outlet communicating with the inner end of said tube and being centered in the bowl and lying adjacent to the bottom of it when the device is clamped to the bowl rim.

2. The combination as set forth in claim 1: and in which
    (a) said perforated air outlet is in the form of a hollow disc-shaped header having a top wall with air outlet openings therein and a bottom wall spaced from said top wall; and
    (b) a pin extending downwardly from the center of said bottom wall and resting on the bowl bottom for spacing the header a desired distance above the bowl bottom.

3. The combination as set forth in claim 1: and in which
    (a) said perforated air outlet is in the form of a hollow U-shaped header that lies in a horizontal plane and has air outlet openings in its upper portion; and
    (b) each leg of the header has a depending pin adapted to rest on the bowl bottom for spacing the header a desired distance above the bowl bottom.

References Cited
UNITED STATES PATENTS

| | | | |
|---|---|---|---|
| 1,194,373 | 8/1916 | Fralick | 110—3.5 |
| 2,950,669 | 8/1960 | Terry | 126—25 |

OTHER REFERENCES

"New Aids to Living," Popular Science, March 1957, volume 170, No. 3, page 160.

FREDERICK L. MATTESON, JR., *Primary Examiner.*

E. G. FAVORS, *Assistant Examiner.*